United States Patent
Higashi et al.

(10) Patent No.: US 8,068,954 B2
(45) Date of Patent: Nov. 29, 2011

(54) STEERING APPARATUS FOR VEHICLE

(75) Inventors: Kenji Higashi, Nara (JP); Shiro Nakano, Osaka (JP); Masami Naka, Nara (JP)

(73) Assignee: JTEKT Corporation, Osaka-Shi (JP)

( * ) Notice: Subject to any disclaimer, the term of this patent is extended or adjusted under 35 U.S.C. 154(b) by 980 days.

(21) Appl. No.: 12/019,219

(22) Filed: Jan. 24, 2008

(65) Prior Publication Data

US 2008/0183354 A1  Jul. 31, 2008

(30) Foreign Application Priority Data

Jan. 29, 2007  (JP) ................................. 2007-018381

(51) Int. Cl.
*B62D 1/10* (2006.01)
*B62D 1/20* (2006.01)
*B62D 15/02* (2006.01)

(52) U.S. Cl. ....................................................... 701/43
(58) Field of Classification Search ................ 701/43
See application file for complete search history.

(56) References Cited

U.S. PATENT DOCUMENTS

| 6,523,637 B1 * | 2/2003 | Nakano et al. ............. 180/402 |
| 6,574,539 B1 * | 6/2003 | Ashrafi ...................... 701/41 |
| 6,650,980 B2 * | 11/2003 | Ashrafi ...................... 701/41 |
| 6,904,999 B2 * | 6/2005 | Kojo et al. ................ 180/422 |
| 2002/0188389 A1 * | 12/2002 | Ashrafi ...................... 701/29 |
| 2004/0016591 A1 * | 1/2004 | Kojo et al. ................ 180/443 |
| 2004/0133323 A1 * | 7/2004 | Kodama et al. ............. 701/41 |
| 2007/0144815 A1 * | 6/2007 | Tsutsumi et al. ........... 180/402 |
| 2011/0022268 A1 * | 1/2011 | Kojo ........................... 701/41 |

FOREIGN PATENT DOCUMENTS

| JP | 2003-252227 A | 9/2003 |
| JP | A-2005-104439 | 4/2005 |

* cited by examiner

*Primary Examiner* — Shelley Chen
(74) *Attorney, Agent, or Firm* — Oliff & Berridge, PLC (57) ABSTRACT

There is provided a steering apparatus to ease an uncomfortable feeling given to an operator when a steering wheel is connected to a steering mechanism, on a fail. The apparatus includes a unit that varies an angular ratio of a steering angle of front wheels with respect to an operational angle of a steering wheel. The apparatus also includes a connection unit such as a electromagnetic clutch for connecting the steering wheel to the steering mechanism in order to fix the angular ratio, on a fail such as a failure of a steering motor. The apparatus also includes a rotational body which relatively rotates with respect to the steering wheel by an angular deviation upon this connection. Accordingly, since a real neutral position of the steering mechanism coincides with a neutral position recognized by a pattern on the rotational body being seen, it eases the uncomfortable feeling onto the operator.

13 Claims, 4 Drawing Sheets

STEERING APPARATUS FOR VEHICLE

CROSS-REFERENCE OF RELATED APPLICATION

This Nonprovisional application claims priority under 35 U.S.C. §119(a) on Patent Application No. 2007-018381 in Japan on Jan. 29, 2007, the entire contents of which are hereby incorporated by reference.

BACKGROUND

1. Technical Field

The present invention relates to a steering apparatus for a vehicle provided with an angular ratio varying device which can vary a ratio of a steering angle of a steerable vehicle wheel with respect to an operational angle of a steering member.

2. Description of Related Art

Steering of a vehicle is carried out by operating a steering mechanism in accordance with the operation of a steering member such as a steering wheel and varying a steering angle of a steerable vehicle wheel by the operation of the steering mechanism. In recent years, as a steering apparatus for a vehicle to carry out such a steering, one that is configured so as to be able to vary an angular ratio (=a steering angle/an operational angle) of the steering angle of the steerable vehicle wheel with respect to the operational angle of the steering member has been known (for example, refer to Japanese Patent Application Laid-Open No. 2003-252227).

The steering apparatus for a vehicle described in Japanese Patent Application Laid-Open No. 2003-252227 is a separation-type steering apparatus for a vehicle, namely, a so-called steer-by-wire system steering apparatus for a vehicle, which is configured in such a manner that a steering member to be operated by an operator and a steering mechanism operating so as to steer a steerable vehicle wheel are mechanically separated; attaching a steering motor to the steering mechanism, the steering motor is operated based on the operational direction and the operational angle of the steering member; and the steering force is added to the steering mechanism to carry out steering, namely, a so-called Steer-by-Wire System of steering apparatus for a vehicle. This steering apparatus for a vehicle can freely vary the angular ratio of the steering angle with respect to the operational angle without being mechanically restricted by operating the steering mechanism driving the steering motor.

According to the steering apparatus for a vehicle of the above-described Japanese Patent Application Laid-Open No. 2003-252227, a steering control unit imports an operational angle of the steering wheel that is detected by an operational angle sensor (Paragraph [0023]) and imports a real steering angle (a steering angle) of a wheel for steering to be steered that is detected by a real steering angle sensor (Paragraph [0020]). A steering angle control unit obtains a target steering angle by multiplying the imported operational angle by a predetermined control gain. The steering angle control unit carries out steering control operation by a feedback control based on a deviation between the target steering angle and the real steering angle. The control gain is determined as a value that is decreased depending on increase of a speed of a car or a value that is decreased depending on increase of a swing degree of a vehicle to be decided by a yaw rate or a lateral acceleration (Paragraphs [0026] and [0027]). As described above, in the steering apparatus for a vehicle of the above-described Japanese Patent Application Laid-Open No. 2003-252227, the angle ratio of the real steering angle (the steering angle) with respect to the operational angle can be varied by control of the steering angle control unit.

Varying a steering property in accordance with a running condition such as a difference in height of a speed of a car and a measure of the operational angle by varying the angular ratio of the steering angle with respect to the operational angle, the steering apparatus for a vehicle of the above-described Japanese Patent Application Laid-Open No. 2003-252227 can carry out steering suitable for the running condition. In addition, by varying only the steering angle of the steerable vehicle wheel, it is also possible to carry out active steering such as a motion control on a slip and avoidance of a danger of an obstacle.

However, in the steering apparatus for a vehicle as in the above-described Japanese Patent Application Laid-Open No. 2003-252227, in a case where an abnormality is caused in any of a control device for variably controlling an angular ratio and various sensors to be used for this control to be made into a fail condition, it is feared that steering is interfered by an inappropriate control to be carried out under this condition. Therefore, the steering apparatus for a vehicle in the above-described Japanese Patent Application Laid-Open No. 2003-252227 is configured so as to be capable of carrying out manual steering by arranging an electromagnetic clutch between the steering member and the steering mechanism and mechanically connecting the steering member to the steering mechanism due to the engagement operation of the electromagnetic clutch in the fail condition.

SUMMARY

However, in the steering apparatus for a vehicle as above described, since the angular ratios before or after connection are generally different when the steering member and the steering mechanism are mechanically connected in the fail condition, even if the steerable vehicle wheel returns to a straight position, in other words, even if the steering mechanism returns to a neutral position, it is feared that the steering member does not return to a reference position that has been determined in advance in accordance with the neutral position of the steering mechanism and this makes an operator feel an uncomfortable feeling.

Accordingly, an object is to provide a steering apparatus for a vehicle that can ease an uncomfortable feeling to be given to the operator by arranging a neutral indicator that becomes a predetermined rotational position when a steering mechanism is located on a neutral position in a steering member and coinciding a real neutral position of the steering mechanism to the neutral position to be recognized by the neutral indicator when the steering member is connected to the steering mechanism in the fail condition.

There is provided a steering apparatus for a vehicle according to an aspect, having a steering mechanism for being provided with a steerable vehicle wheel to be steered upon an operation of a steering member which is mechanically disconnected from the steering mechanism, comprising: a first controller capable of performing the operation of varying an angular ratio of a steering angle of the steerable vehicle wheel versus an operational angle of the steering member; a connection unit connecting the steering member to the steering mechanism such that the angular ratio is fixed, the connection unit being activated when the operation of the varying of the angular ratio is abnormal; a neutral indicator provided in the steering member, being relatively coaxially rotatable with respect to the steering member, and positioning in a predetermined rotational position when the steering mechanism positions in a neutral position; a rotation unit relatively rotating the neutral indicator with respect to the steering member; and a second controller capable of performing the operation of allowing the rotation unit to rotate the neutral indicator into the predetermined rotational position, in the case that the steering mechanism positions in the neutral position thereof, when the connection unit becomes active.

There is provided a displaying method for a steering position according to an aspect, the method being applied to a steering apparatus having a steering mechanism for being provided with a steerable vehicle wheel to be steered upon an operation of a steering member which is mechanically disconnected from the steering mechanism, the method comprising: providing a neutral indicator in the steering member, the neutral indicator being relatively coaxially rotatable with respect to the steering member, and the neutral indicator positioning in a predetermined rotational position when the steering mechanism positions in a neutral position; determining whether or not at least a part of the steering mechanism is in a fail condition; and allowing the rotation unit to rotate the neutral indicator into the predetermined rotational position, in the case that the steering mechanism positions in the neutral position thereof, when the determination represents the fail condition.

DETAILED DESCRIPTION

Figure 1:
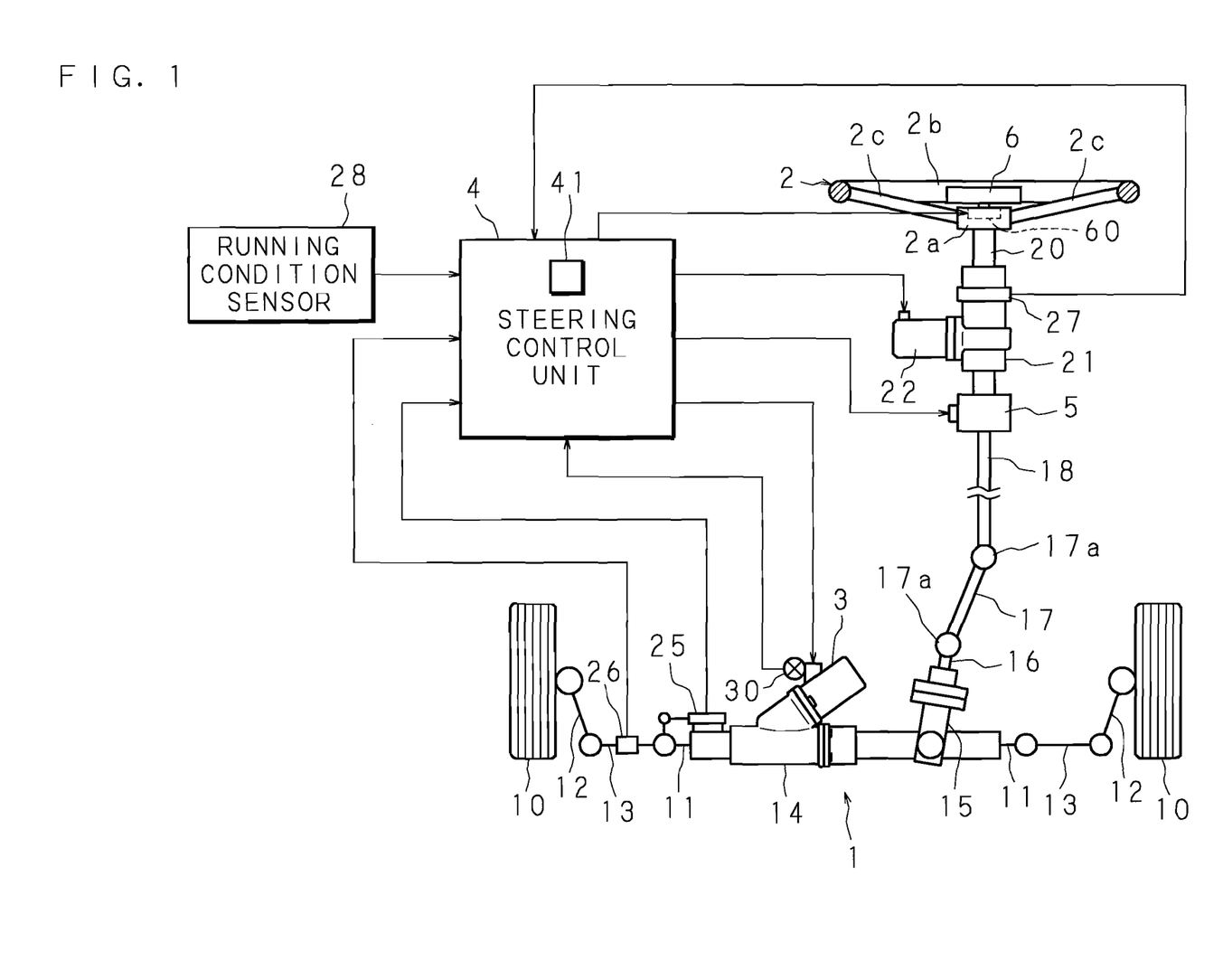
FIG. 1 is a schematic view showing a structure of a steering apparatus for a vehicle according to an embodiment of the present invention.

FIG. 1 is a schematic view showing a structure of a steering apparatus for a vehicle according to an embodiment of the present invention.

The steering apparatus for a vehicle is provided with a steering mechanism 1 for steering front wheels 10, 10 as steerable vehicle wheels that are arranged right and left of a vehicle body. The steering apparatus is also provided with a steering wheel 2 that is a steering member to be rotationally operated for steering and is arranged to be mechanically separated from the steering mechanism 1. The steering apparatus is also provided with a steering motor 3 to be driven so as to add a steering force to the steering mechanism 1 in accordance with the operation of the steering wheel 2 and a steering control unit 4.

The steering mechanism 1 is provided with a steering shaft 11 that is elongated in a horizontal direction of a vehicle body to be moved in a shaft length direction. The opposite ends of the steering shaft 11 are connected to knuckle arms 12, 12 of the front wheels 10, 10 via tie rods 13, 13, respectively. The steering mechanism 1 is configured so as to horizontally steer the front wheels 10, 10 by pushing and pulling the knuckle arms 12, 12 via the tie rods 13, 13 due to movement in a horizontal direction of the steering shaft 11.

A housing 14 supports the steering shaft 11 movably in a shaft length direction. The steering motor 3 is attached to the outside in a midstream of the housing 14 and an output shaft of the steering motor 3 is elongated to the inside of the housing 14. The steering motor 3 transmits an output to the midstream of the steering shaft 11 via a motion conversion mechanism such as a ball screw mechanism. When the steering motor 3 is rotationally operated, this rotation is converted into a motion in a shaft length direction of the steering shaft 11 by the motion conversion mechanism. In accordance with this motion, the above-described steering is carried out.

The steering control unit 4 gives a control instruction to a driving circuit (not illustrated) of the steering motor 3. The steering motor 3 is driven in accordance with this control instruction. On a connection portion between the steering shaft 11 and one tie rod 13, a location sensor 25 for detecting a moving position of the steering shaft 11 moving in accordance with the steering is attached. A detection value of the moving position of the steering shaft 11 by the location sensor 25 is given to the steering control unit 4 as a detection value showing steering angles of the front wheels 10, 10. In addition, on the one tie rod 13, a shaft force sensor 26 for detecting a shaft force to act in a shaft length direction is attached. A detection value of the shaft force by the shaft force sensor 26 is given to the steering control unit 4 showing a reaction force (hereinafter, referred to as a road surface reaction force) to be added to the steering mechanism 1 from a road surface in accordance with steering. In addition, a current sensor 30 for detecting the driving current of the steering motor 3 is attached to the steering motor 3. A detection value of the driving current by the current sensor 30 is also given to the steering control unit 4.

According to the embodiment, the steering control unit 4 is provided with an (auxiliary) control unit 41. This control unit 41 can output a control instruction for carrying out engagement control and positioning to be described later in a fail condition to be described later. The steering control unit 4 can arbitrarily use a control instruction that is outputted by the control unit 41 as a control instruction to be outputted to each unit. In other words, the control unit 41 is a unit for a fail safe, which can act for at least a partial function of the steering control unit 4, in the fail condition to be described later. Further, according to other embodiments, the control unit 41 may be an independent unit having a function that is equal to the steering control unit 4. In this case, a plurality of control units may be arranged. The steering control unit 4 and the plurality of control units respectively output a control instruction. A control instruction that is selected from among these control instructions based on a principle of majority rule is given to each unit.

In addition, the steering wheel 2 is arranged being separated from the steering mechanism 1. A steering shaft 20 is a rotating shaft of the steering wheel 2. The steering wheel 2 is mounted on an arbitrary region of the vehicle body (not illustrated) via a column housing 21 for freely supporting the steering shaft 20. A reaction motor 22 is mounted on a midstream part of the column housing 21. This is rotationally driven so as to add a steering reaction force in accordance with the road surface reaction force. An output shaft of the reaction motor 22 is elongated to the inside of the column housing 21. The output shaft of the reaction motor 22 transmits an output to a midstream part of the steering shaft 20 via a reduction mechanism such as a worm gear mechanism. When the reaction motor 22 is rotationally operated, a rotational force is reduces by the reduction mechanism to be given to the steering shaft 20. This is given to the steering wheel 2 that is fixed on the upper end of the steering shaft 20.

The steering control unit 4 gives a control instruction to a driving circuit (not illustrated) of the reaction motor 22. The reaction motor 22 will be driven in accordance with this control instruction. On the midstream part of the column housing 21, a rotation angle sensor 27 is arranged, and the rotation angle sensor 27 detects a rotation angle of the steering wheel 2 that is rotationally operated against the steering reaction force. A detection value of a rotation angle by the rotation angle sensor 27 is given to the steering control unit 4 as a detection value showing an operational angle of the steering wheel 2 that is rotated in accordance with steering. In addition, a running condition sensor 28 is mounted on each unit of the vehicle. To the steering control unit 4, a detection value showing a running condition showing a speed of a car, a yaw rate, a lateral acceleration, and a longitudinal acceleration or the like is given.

The steering control unit 4 carries out the steering control to move the steering shaft 11 for performing steering by driving the steering motor 3 in accordance with the rotation operation of the steering wheel 2. In this control, increasing and decreasing a current to be supplied to the reaction motor 22 in accordance with the road surface reaction force, a reaction force control to increase and decrease the steering reaction force to be added to the steering wheel 2 is carried out.

The steering control of the steering control unit 4 relevant to the steering motor 3 includes obtaining of a target steering angle, for example, by multiplying the operational angle of the steering wheel 2 to be detected by the rotation angle sensor 27 by a predetermined control gain and driving of the steering motor 3 based on the obtained target steering angle. The steering angles of the front wheels 10, 10 on right and left sides to be detected by the location sensor 25 are used as feedback information on controlling the steering.

The running condition detected by the running condition sensor 28 will be used for selection of the control gain in this steering control. This steering control is determined so as to be made large or small in accordance with slowness or speedy of the speed of the car. This control gain is further determined as a value that is made smaller as a swing degree of a vehicle to be decided by a yaw rate or a lateral acceleration is made larger. In order to realize a steering property in accordance with the running condition, the steering motor 3 is controlled based on the target steering angle that is obtained by multiplying the road surface reaction force by such a control gain.

In addition, the reaction force control of the steering control unit 4 relevant to the reaction force motor 22 includes, for example, obtaining of a road surface reaction force to be added to the steering mechanism 1 based on the shaft force to be detected by the shaft force sensor 26; calculation of the target steering reaction force to be added to the steering wheel 2 by multiplying the obtained road surface reaction by a predetermined control gain; and increase and decrease of the driving current of the reaction force motor 22 in accordance with this target steering reaction force.

Under this reaction force control, the running condition to be detected by the running condition sensor 28 is used for correction of the control gain. This correction is carried out, for example, so that the control gain is made larger as the speed of the car and the swing degree are made larger. Further, this correction is carried out so that the control gain is made larger as the deceleration degree to be obtained by the longitudinal acceleration is made larger. In addition, the operational angle of the steering wheel 2 to be detected by the rotation angle sensor 27 may be used for correction of the target steering reaction force. Thereby, an increase and decrease property of the driving current of the reaction force motor 22 is varied.

Due to this reaction force control, the rotational force of the reaction force motor 22 is added to the steering shaft 20. This rotational force is added to the steering wheel 2 as a steering reaction force. This steering reaction force is obtained by correcting the road surface reaction force to be added to the steering mechanism 1 in practice in accordance with the running condition. Due to this steering reaction force, the operator who operates the steering wheel 2 can feel a good steering feeling.

On the midstream part of the housing 14 separated from the attaching position of the steering motor 3, a pinion housing 15 is continued so as to cross this midstream part of the housing 14, and a pinion shaft 16 is supported in the inside of this pinion housing 15 so as to be capable of being rotated around a shaft. On the lower part of this pinion shaft 16, a pinion tooth (not illustrated) is formed, and the pinion tooth is engaged with a rack tooth formed across an arbitrary length on the outer face of the steering shaft 11 on a crossing part with the housing 14.

On the other hand, a transmission shaft 18 is coupled to the upper end of the pinion shaft 16 projecting to the upper part of the pinion housing 15 via an intermediate shaft 17 provided with free junctions 17a, 17a on its opposite ends. This transmission shaft 18 is supported so as to be capable of being rotated around the shaft to be elongated upward toward the arrangement position of the steering wheel 2.

In addition, the steering shaft 20 that is a rotational shaft of the steering wheel 2 projects to the lower part of the column housing 21 across an arbitrary length to be confronted against the upper end portion of the transmission shaft 18, and an electromagnetic clutch 5 is located on this confronting portion.

The steering control unit 4 gives a control instruction to an excitation circuit of the electromagnetic clutch 5 (not illustrated). The electromagnetic clutch 5 is a publicly-known connection device, which is engaging-operated in accordance with the given control instruction. The steering control unit 4 carries out the engagement control to engage the electromagnetic clutch 5 in accordance with the determination of the fail condition. The determination of this fail condition will be described later. When the electromagnetic clutch 5 is in the engagement condition, the steering shaft 20 is mechanically connected to the transmission shaft 18. The rotation of the steering shaft 20 in accordance with the rotational operation of the steering wheel 2 will be transmitted to the transmission shaft 18 via the electromagnetic clutch 5. This rotation transmitted to the transmission shaft 18, as described above, will be transmitted to the pinion shaft 16 via the free junctions 17a, 17a and the intermediate shaft 17. This rotation transmitted to the pinion shaft 16 is converted into movement in a shaft length direction of the steering shaft 11 on the engagement portion between the pinion tooth and the rack tooth. In this way, since the transmission shaft 18 and the steering shaft 20 are mechanically connected by engagement of the electromagnetic clutch 5, the rotational operation force of the steering wheel 2 is transmitted to the steering shaft 11 and manual steering becomes available.

Figure 2:
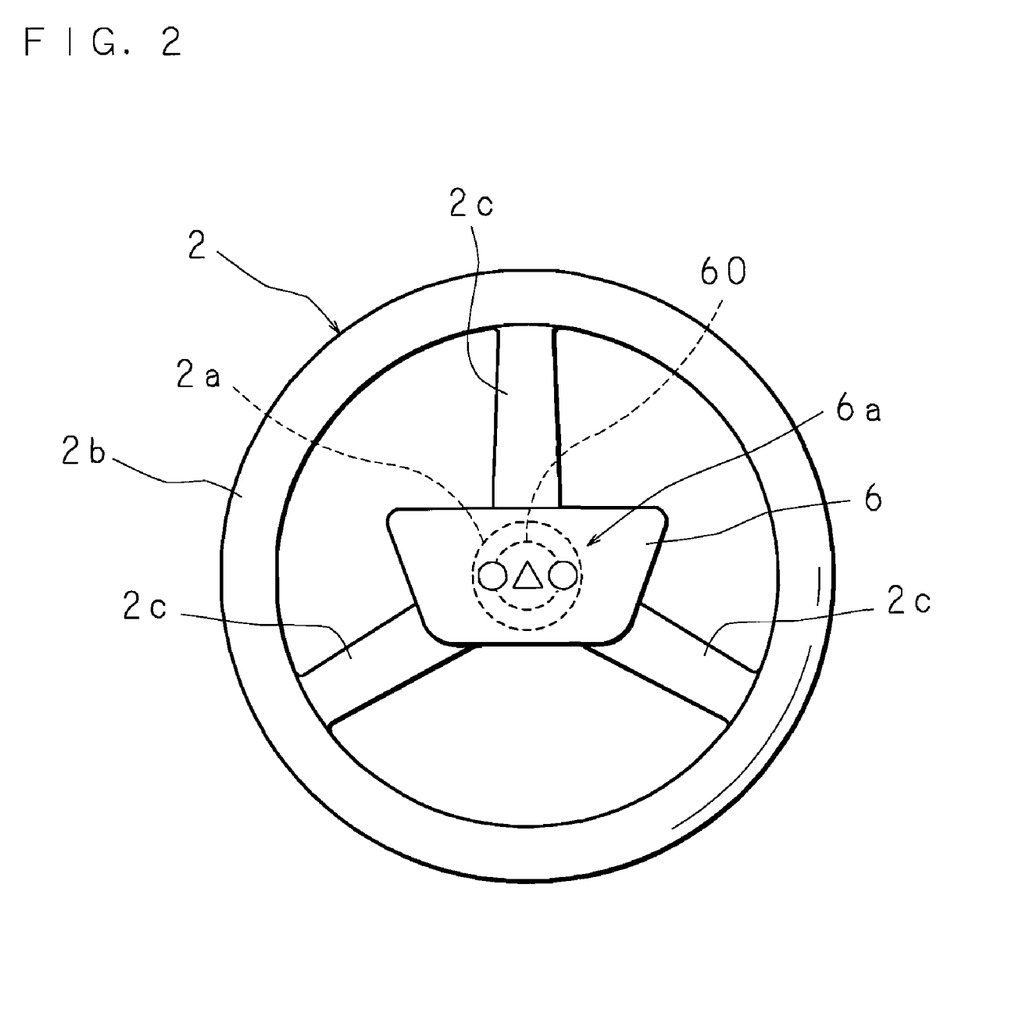
FIG. 2 is a view schematically showing a steering wheel of the steering apparatus for a vehicle according to the present invention.

FIG. 2 is a view schematically showing the steering wheel 2 of the steering apparatus for a vehicle according to the present invention. As shown in FIG. 1 and FIG. 2, the steering wheel 2 is configured by coupling a flat columnar hub 2a and a circular rim 2b that are mounted on the same shaft on the upper end of the steering shaft 20 by a plurality of spokes (three in FIG. 2) 2c.

In the hub 2a, a motor for an indicator rotation (an indicator rotation device) 60 is fixed concentrically with the steering shaft 20. An output shaft extending from one side of the motor 60 projects to the inverse side of the steering shaft 20. On a projection end of the output shaft of this motor 60, a rotational body (a neutral indicator) 6 is fitted and fixed. On the surface of the rotational body 6, a pattern 6a such as a letter, a mark, a figure, and a picture are mentioned. This pattern 6a is provided so as to allow the operator to recognize that the front wheels 10, 10 are located in straight positions. In other words, this pattern 6a is provided so as to allow the operator to recognize that the steering mechanism 1 is located on a neutral position. FIG. 2 illustrates the condition that the steering mechanism 1 is located on a neutral position. The illustrated pattern 6a is a combination of three marks (in FIG. 2, they are a circle, a triangle, and a circle, that is ○△○). When the steering mechanism 1 is located on the neutral position, these three marks are horizontally aligned on one line. The operator can recognize that the steering mechanism 1 is in a straight condition by viewing of the pattern 6a.

The rotational body 6 is integrally rotated together with the motor 60 in accordance with the rotation of the steering wheel 2. In a case where the motor 60 is rotationally driven, the rotational body 6 is relatively rotated for the steering wheel 2.

The steering control unit 4 gives a control instruction to a driving circuit (not illustrated) of the motor 60 for the indicator rotation. The motor 60 for the indicator rotation will be driven in accordance with the given control instruction. The steering control unit 4 drives the motor 60 for the indicator rotation so as to relatively rotate the rotational body 6 for the steering wheel 2. The steering control unit 4 drives the motor 60 for the indicator rotation so as to position the neutral position indicated by the pattern 6a mentioned on the rotational body 6 to coincide with the neutral position of the real steering mechanism 1. Thereby, the neutral position of the real steering mechanism 1 is illustrated by the pattern 6a mentioned on the rotational body 6.

Figure 3:
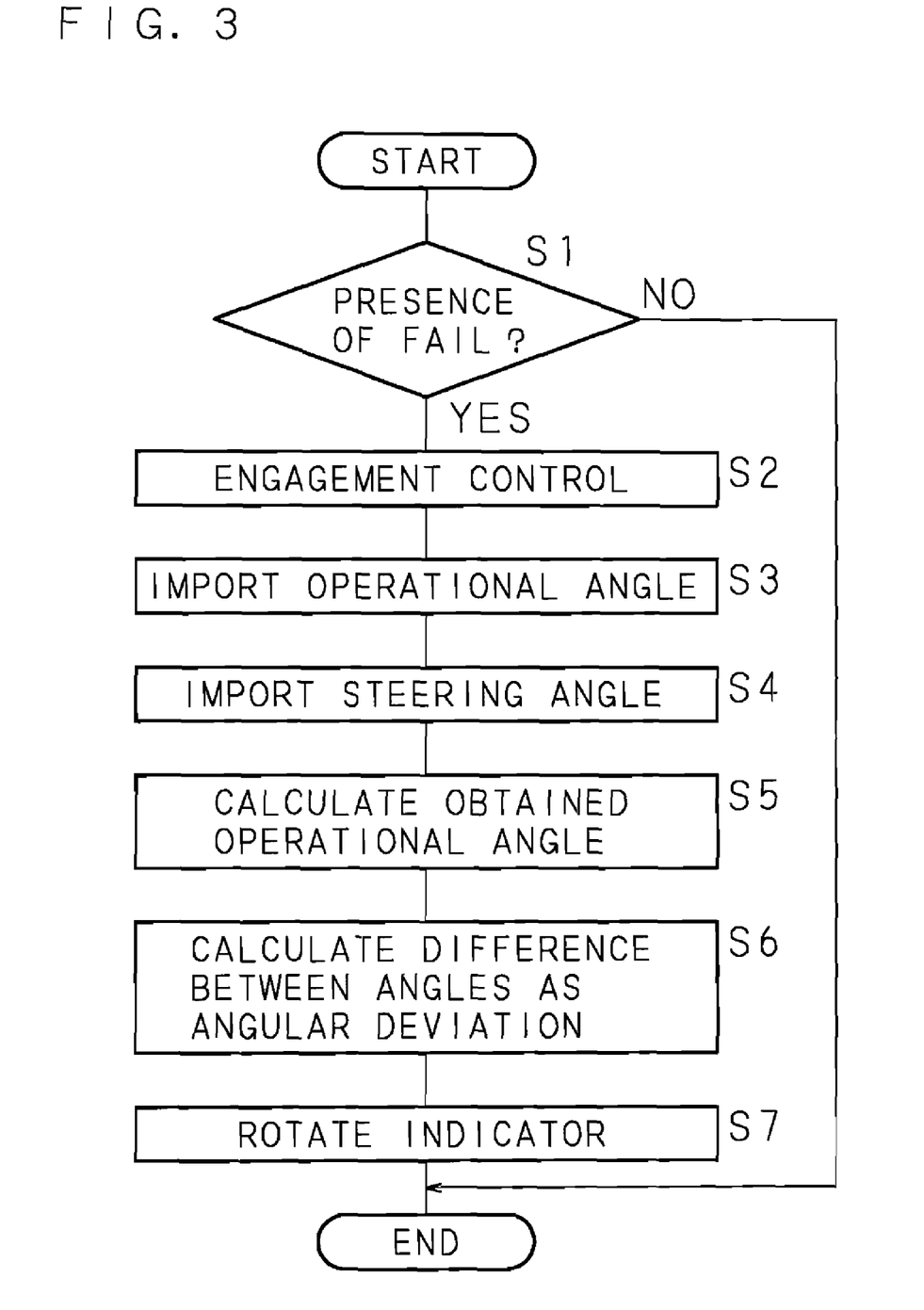
FIG. 3 is a flow chart showing operations of a steering control unit when the steering apparatus for a vehicle is in a fail condition.

According to the embodiment, it is assumed that, in a case where an abnormality is caused in any of the steering motor 3, the steering control unit 4, and various sensors to be used for this control, at least a part of the steering apparatus for a vehicle is in the fail condition. The steering control unit 4 carries out this positioning together with the above-described engagement control in the fail condition. FIG. 3 is a flow chart showing operations of the steering control unit 4 when the steering apparatus, shown in FIG. 1, for a vehicle is in the fail condition. Further, the operation of the steering control unit 4 shown in FIG. 3 will be carried out as the interrupt processing during the steering control and the reaction force control.

The steering control unit 4 determines presence or absence of the fail (step S1). For example, the fact that there is a fail in the steering motor 3 is determined in the following case, namely, the operational angle of the steering wheel 2 to be detected by the rotation angle sensor 27 is not 0; and the driving current of the steering motor 3 to be detected by the current sensor 30 is 0.

In step S1, when it is determined that there is no fail (step S1: NO), the processing is finished without carrying out the following operation. When it is determined that there is a fail (step S1: YES), proceeding to step S2, as described above, the engagement control to engage the electromagnetic clutch 5 will be carried out (step S2). By engagement of the electromagnetic clutch 5, the steering wheel 2 is connected to the steering mechanism 1, and the manual steering as described above becomes available.

Next, the operational angle of the steering wheel 2 to be detected by the rotation angle sensor 27 is imported (step S3). Further, the steering angles of the front wheels 10, 10 on the right and left sides to be detected by the location sensor 25 are imported (step S4).

Next, using the steering angle imported in step S4, this steering angle is divided by the angular ratio that has been determined in advance on connection. The operational angle corresponding to this steering angle is obtained (step S5). The obtained operational angle is subtracted from the operational angle imported in step S3. Thereby, an angular deviation corresponding to a difference between the operational angle and the steering angle that present at this point of time will be calculated (step S6). This angular deviation is a difference between the position where the rotational body 6 should be located and the position where the rotational body 6 is located at the present.

Next, the steering control unit 4 gives a control instruction to a driving circuit (not illustrated) of the motor 60 for the indicator rotation so as to rotate the rotational body 6 just match as the angular deviation that is calculated in step S6 (step S7). The motor 60 for the indicator rotation is driven in accordance with the control instruction to be given to the driving circuit and the rotational body 6 is rotated just match as the calculated angular deviation.

Figure 4A:
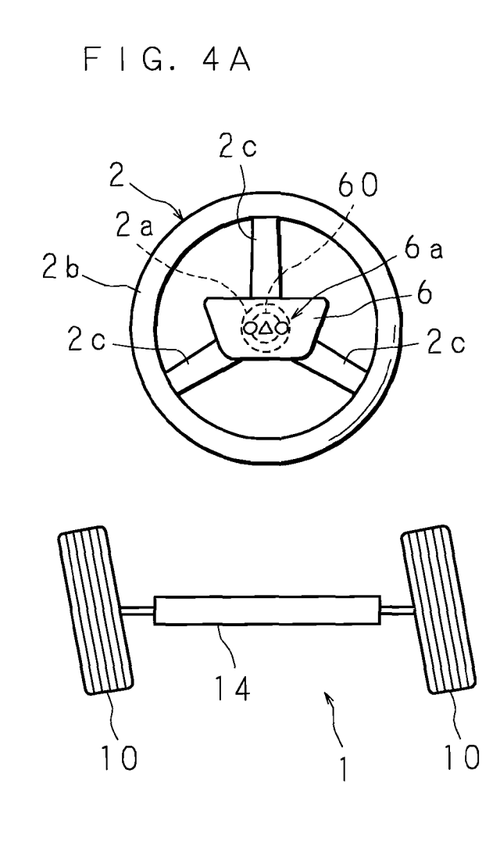
FIGS. 4A to 4C are explanatory views of operations of the steering wheel and a steering mechanism.
Figure 4B:
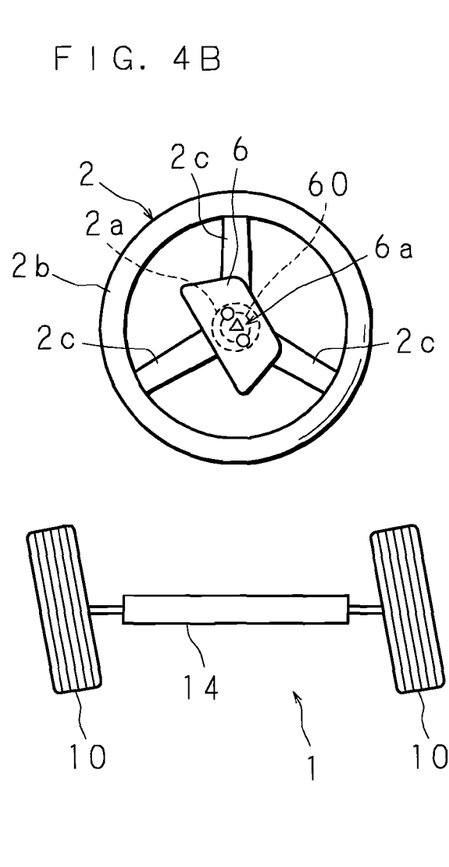
Figure 4C:
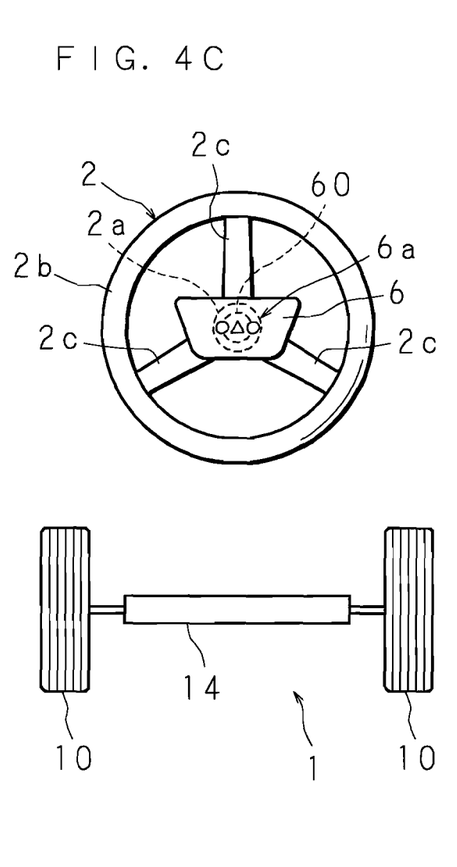

FIGS. 4A to 4C are explanatory views of operations of the steering wheel 2 and the steering mechanism 1, that are caused by positioning operation. For convenience of explanation, the following conditions are supposed. Namely, as shown in FIG. 4A, three marks as the pattern 6a mentioned on the rotational body 6 are horizontally aligned on one line; the rotational body 6 is located on a predetermined rotational position corresponding to the neutral position of the steering mechanism 1; the steering mechanism 1 is steered left; and the steering apparatus is in the fail condition. In this state, the electromagnetic clutch 5 is engaged in accordance with the fail determination. Further, due to the above-described positioning, only the rotational body 6 is rotated just match as the angular deviation that is obtained in step S6 of FIG. 3 in the same left direction as that of the front wheels 10, 10. The rotational body 6 and the pattern 6a of the rotational body 6 are made in the condition shown in FIG. 4B. After that, when the steering mechanism 1 returns to the neutral position, the steering wheel 2 connected to the steering mechanism 1 is rotated. Herewith, the rotational body 6 is rotated and the pattern 6a is made into the condition shown in FIG. 4C. In this case, the neutral position shown by the rotational body 6 on which the pattern 6a is mentioned coincides with a real neutral position of the steering mechanism 1. Further, the condition shown in FIG. 4A may be available when the active steering such as a motion control on a slip and avoidance of a danger of an obstacle is carried out.

As described above, according to the steering apparatus for the vehicle of the present invention, on the fail such as a failure of the steering motor 3, mechanically connecting the steering wheel 2 to the steering mechanism 1 by the electromagnetic clutch 5, the angular ratio of the front wheels 10, 10 with respect to the operational angle of the steering wheel 2 is fixed, the rotational body 6 is relatively rotated for the steering wheel 2 by just match as a difference between the operational angle and the steering angle on this connection, and the real neutral position of the steering mechanism 1 is allowed to coincide with the neutral position to be recognized by the rotational body 6 on which the pattern 6a is mentioned, so that it is possible to ease an uncomfortable feeling to the operator.

In addition, since the angular ratio on this connection is obtained when the steering wheel 2 is connected to the steering mechanism 1, it is possible to immediately coincide the real neutral position of the steering mechanism 1 with the neutral position to be recognized by the rotational body 6.

Further, since the rotational body 6, on which the pattern 6a, such as a letter, a mark, a figure, and a picture are mentioned, is defined to be the neutral indicator of the steering mechanism 1, it is possible to ease an uncomfortable feeling to the operator by a simple structure.

Further, according to the present embodiment, arranging the rotational body 6, on which the pattern 6a is mentioned, and the motor 60 for the indicator rotation on the steering wheel 2 and rotating the rotational body 6 by the motor 60 for the indicator rotation, the neutral position of the steering mechanism 1 to be recognized by the pattern 6a is allowed to coincide with the real neutral position of the steering mechanism 1. However, the present invention is not limited to this and providing an image display unit in the steering wheel 2, the neutral position of the steering mechanism 1 to be recognized by an image to be displayed on this image display unit may be allowed to coincide with the real neutral position of the steering mechanism 1. In this case, the image display unit itself provided in the steering wheel 2 may be configured so as to be relatively rotated for the steering wheel 2 or only the image to be displayed on the image display unit may be configured so as to be relatively rotated for the steering wheel 2.

In addition, according to the present embodiment, the electromagnetic clutch 5 is used as a connection device for connecting the steering wheel 2 to the steering mechanism 1 so as to fix the angular ratio between the operational angle of the steering wheel 2 and the steering angles of the front wheels 10, 10, however, the present embodiment is not limited to this and a clutch such as a friction clutch using a frictional force of a junction face and a positive clutch using a joint portion such as a nail may be used.

Further, according to the above-described embodiments, an example to apply the present invention to the Steer-by-Wire System of steering apparatus for a vehicle has been described. Further, various modified examples that are not limited to the above-described embodiments are available. For example, a modified example may be configured so that the angular ratio between the operational angle of the steering wheel and the steering angle of the steerable vehicle wheel are variable. According to this modified example, it is possible to fix the angular ratio by connecting the steering wheel to the steering mechanism on the fail. This modified example may include the steering apparatus for the vehicle that is configured so as to be capable of carrying out the manual steering in this way on the fail. Further, the present invention can be put into practice by variously modified formations within a range of the matters described in the scope of claims.

According to the embodiments, since the neutral indicator is relatively rotated for the steering member when the steering member is mechanically connected to the steering mechanism by means of the connection device on a fail condition (on an abnormal condition) such as a failure of a steering motor, the neutral position of the steering mechanism coincides with the neutral position to be recognized by the neutral indicator provided in the steering member and this makes it possible to ease an uncomfortable feeling given to the operator.

According to the embodiments, since the neutral indicator arranged in the steering member when the steering member is mechanically connected to the steering mechanism is relatively rotated by just match as a difference between the operational angle of the steering member when they are connected and the steering angle of the steerable vehicle wheel, it is possible to immediately coincide the neutral position of the steering mechanism with the neutral position to be recognized by the neutral indicator that is arranged in the steering member.

According to the embodiments, since the detected steering angle and operational angle are imported when the steering member is connected to the steering mechanism; the steering angle on the connection and a difference between the operational angle calculated by using the angular ratio and the operational angle on the connection are calculated; and the neutral indicator is rotated by just match as a difference that is calculated by issuing the operation instruction to the rotating device, it is possible to immediately coincide the neutral position of the steering mechanism with the neutral position to be recognized by the neutral position that is arranged in the steering member.

According to the embodiments, since the rotational body, on which a pattern, for example, a letter, a mark, a figure, and a picture are mentioned, is defined to be a neutral indicator, it is possible to ease an uncomfortable feeling to the operator by a simple structure.

As this description may be embodied in several forms without departing from the spirit of essential characteristics thereof, the present embodiment is therefore illustrative and not restrictive, since the scope is defined by the appended claims rather than by description preceding them, and all changes that fall within metes and bounds of the claims, or equivalence of such metes and bounds thereof are therefore intended to be embraced by the claims.

What is claimed is:

1. A steering apparatus having a steering mechanism for being provided with a steerable vehicle wheel to be steered upon an operation of a steering member which is mechanically disconnected from the steering mechanism, comprising:
   1) a first controller capable of performing the operation of varying an angular ratio of a steering angle of the steerable vehicle wheel versus an operational angle of the steering member;
   2) a connection unit connecting the steering member to the steering mechanism such that the angular ratio is fixed, the connection unit being activated when the operation of varying of the angular ratio is abnormal;
   3) a neutral indicator provided in the steering member, being relatively coaxially rotatable with respect to the steering member, and positioning in a predetermined rotational position when the steering mechanism positions in a neutral position;
   4) a rotation unit relatively rotating the neutral indicator with respect to the steering member; and
   5) a second controller capable of performing the operation of allowing the rotation unit to rotate the neutral indicator into the predetermined rotational position, in the case that the steering mechanism positions in the neutral position thereof, when the connection unit becomes active.

2. The steering apparatus according to claim 1, wherein the second controller allows the rotation unit to relatively rotate the neutral indicator with respect to the steering member by a rotational difference corresponding to a difference between the operational angle and the steering angle, when the connection unit becomes active.

3. The steering apparatus according to claim 1, further comprising:
   a steering angle detection unit detecting the steering angle of the steerable vehicle wheel; and
   an operational angle detection unit detecting the operational angle of the steering member,
   wherein the second controller performs the operation of calculating a difference between an angle calculated from the steering angle using a preset angular ratio and the operational angle when the connection unit becomes active, and
   wherein the second controller allows the rotation unit to relatively rotate the neutral indicator with respect to the steering member by the calculated difference.

4. The steering apparatus according to claim 1, wherein the neutral indicator is a rotating body marked with a pattern so as to be recognizable of a direction which the neutral indicator indicates.

5. The steering apparatus according to claim 1, wherein the abnormality of the operation of varying the angular ratio arises from a failure of the first controller.

6. The steering apparatus according to claim 1, wherein the abnormality of the operation of varying the angular ratio arises from a failure of a steering motor for steering the steerable vehicle wheel.

7. The steering apparatus according to claim 1,
wherein the rotation unit is a motor operating based on a instruction given by the second controller, and
wherein the second controller gives, to the motor, the instruction with which the neutral indicator is rotated with respect to the steering member into the predetermined rotational position, in the case that the steering mechanism positions in the neutral position thereof, when the connection unit becomes active.

8. The steering apparatus according to claim 2,
wherein the rotation unit is a motor operating based on a instruction given by the second controller, and
wherein the second controller gives, to the motor, the instruction with which the neutral indicator is rotated with respect to the steering member by the rotational difference, when the connection unit becomes active.

9. The steering apparatus according to claim 3,
wherein the rotation unit is a motor operating based on a instruction given by the second controller, and
wherein the second controller gives, to the motor, the instruction with which the neutral indicator is rotated with respect to the steering member by the calculated difference, when the connection unit becomes active.

10. A steering apparatus for a vehicle comprising:
1) a varying device for varying an angular ratio that is a ratio of a steering angle of a steerable vehicle wheel versus an operational angle of a steering member;
2) a connection device for connecting the steering member to a steering mechanism for steering the steerable vehicle wheel so as to fix the angular ratio, which is operated when the varying device is abnormal;
3) a neutral indicator, which is arranged in the steering member so as to be capable of being relatively rotated on the same axis and becomes a predetermined rotational position when the steering mechanism is located on a neutral position;
4) a rotation device for allowing the neutral indicator to be relatively rotated for the steering member; and
5) a control device, which operates the rotation device in a case where the connection device is operated such that the neutral indicator becomes a predetermined rotational position when the steering mechanism returns to the neutral position.

11. The steering apparatus according to claim 10, characterized by being configured so that the control device operates the rotation device so as to relatively rotate the neutral indicator for the steering member by just match as a difference between the operational angle and the steering angle.

12. The steering apparatus according to claim 10, further comprising:
a steering angle detecting device for detecting a steering angle of the steerable vehicle wheel; and
an operational angle detecting device for detecting the operational angle of the steering member,
an importing device for importing a steering angle that is detected by the steering angle detecting device and an operational angle that is detected by the operational angle detecting device;
an operational angle calculating device for calculating an operational angle corresponding to the steering angle by using the steering angle imported by the importing device and the angular ratio determined in advance;
a difference calculating device for calculating a difference between the operational angle calculated by the operational angle calculating device and the operational angle imported by the importing device; and
a device for issuing an operation instruction to the rotating device so as to rotate the neutral indicator by just match as a difference that is calculated by the difference calculating device.

13. The steering apparatus according to claim 10, the neutral indicator is a rotational body, which is arranged so as to be relatively rotated for the steering member and a pattern capable of recognizing a direction is marked on the neutral indicator.

* * * * *